United States Patent
Enns et al.

(10) Patent No.: US 9,258,941 B2
(45) Date of Patent: Feb. 16, 2016

(54) ROTARY CROP HARVESTING MACHINE WITH CUTTER BAR TILT CONTROL

(71) Applicant: MacDon Industries Ltd., Winnipeg (CA)

(72) Inventors: John Edward Enns, Winnipeg (CA); Roger L Patterson, Duncan (CA)

(73) Assignee: MacDon Industries Ltd., Winnipeg, Manitoba (CA)

(*) Notice: Subject to any disclaimer, the term of this patent is extended or adjusted under 35 U.S.C. 154(b) by 67 days.

(21) Appl. No.: 14/031,656

(22) Filed: Sep. 19, 2013

(65) Prior Publication Data

US 2014/0150391 A1  Jun. 5, 2014

Related U.S. Application Data

(60) Provisional application No. 61/727,953, filed on Nov. 19, 2012.

(51) Int. Cl.
*A01D 67/00* (2006.01)
*A01D 34/00* (2006.01)
*A01D 34/66* (2006.01)

(52) U.S. Cl.
CPC ............ *A01D 34/006* (2013.01); *A01D 34/662* (2013.01)

(58) Field of Classification Search
CPC ....... A01D 57/16; A01D 41/14; A01D 34/02; A01D 41/141; A01D 75/287; A01D 34/661; A01D 34/662; A01D 41/145
USPC ........................ 56/208, 15.8, DIG. 10, 10.2 R
See application file for complete search history.

(56) References Cited

U.S. PATENT DOCUMENTS

| | | | | |
|---|---|---|---|---|
| 4,441,307 A | * | 4/1984 | Enzmann | 56/208 |
| 4,473,993 A | * | 10/1984 | Jennings et al. | 56/208 |
| 4,573,308 A | * | 3/1986 | Ehrecke et al. | 56/14.4 |
| 5,404,695 A | * | 4/1995 | Gemelli | 56/6 |
| 6,250,055 B1 | * | 6/2001 | Franet | 56/15.9 |
| 6,826,894 B2 | * | 12/2004 | Thiemann et al. | 56/10.2 E |
| 7,308,947 B2 | | 12/2007 | Barnett | |
| 7,340,876 B1 | | 3/2008 | Barnett | |
| 8,006,469 B2 | | 8/2011 | Barnett | |
| 8,015,784 B2 | | 9/2011 | Barnett | |
| 2003/0074876 A1 | * | 4/2003 | Patterson et al. | 56/257 |
| 2007/0068129 A1 | * | 3/2007 | Strosser | 56/10.2 E |

(Continued)

FOREIGN PATENT DOCUMENTS

| | | |
|---|---|---|
| CA | 2559353 | 3/2008 |
| CA | 2639032 | 9/2011 |
| DE | 4007735 | 9/1991 |

*Primary Examiner* — Árpád Fábián-Kovács
(74) *Attorney, Agent, or Firm* — Adrian D. Battison; Ryan W. Dupuis; Ade & Company Inc.

(57) ABSTRACT

A crop header has generally horizontal flail disks mounted for driven rotation about generally upright axes of a cutter bar. A tilting system is provided for tilting the cutter bar about an axis transverse to the machine so as to tilt the cutting plane from a generally horizontal position forwardly and rearwardly. A sensor is provided which is responsive to upward and downward floating movement of the cutter bar relative to the support frame and is arranged to analyze changes in the signal to determine times when the cutter bar is moving upwardly when the cutter bar is tilted rearwardly, times when the cutter bar is moving downwardly when the cutter bar is tilted forwardly and times when the cutter bar is remaining at a constant height.

6 Claims, 2 Drawing Sheets

(56) References Cited

U.S. PATENT DOCUMENTS

| | | |
|---|---|---|
| 2008/0066440 A1 | 3/2008 | Barnett |
| 2008/0072560 A1* | 3/2008 | Talbot .......................... 56/208 |
| 2009/0107097 A1* | 4/2009 | Thompson et al. ........... 56/15.8 |
| 2009/0107688 A1* | 4/2009 | Bollinger et al. ............... 172/1 |
| 2011/0047948 A1* | 3/2011 | Thompson ..................... 56/17.1 |
| 2013/0283745 A1* | 10/2013 | Brendon et al. ............ 56/10.2 A |
| 2014/0041352 A1* | 2/2014 | Johnson ..................... 56/10.2 R |

* cited by examiner

ROTARY CROP HARVESTING MACHINE WITH CUTTER BAR TILT CONTROL

This application claims the benefit under 35 USC 119 (e) of Provisional Application 61/727,953 filed Nov. 19, 2012.

This invention relates to a crop harvesting header which has a cutter bar across the width of the header and particularly to an improved arrangement for controlling the orientation of the cutter bar about an axis along the cutter bar so as to change the angle of attack.

The invention is particularly applicable to headers which use rotary cutting disks but can also be used in other types of headers for example sickle headers which may use an auger or drapers for crop collection.

BACKGROUND OF THE INVENTION

Crop harvesting headers which use rotary cutters in replacement for the more conventional sickle knife systems have been available for many years. It is well known that such rotary cutters include a cutter bar or gear train which provides the main structural and drive communication components of the cutter. The cutter bar provides a series of longitudinally spaced vertical drive members each of which drives a respective one of a plurality of cutting disks at spaced positions along the cutter bar. The disks are mounted for rotation about a vertical axis standing upwardly from the cutter bar. The disks carry at a point on their outer edge a plurality, generally two, of flail type blades which rotate with the disk around the vertical axis in a cutting action.

The construction of the cutter bar itself including the suitable gear train is well known and a number of different designs are available which can be used by a person skilled in this art.

Examples of such rotary type cutters are shown in the following documents assigned to the present applicants:

U.S. Pat. No. 7,340,876 issued Mar. 11, 2008 which corresponds to U.S. Published Application 2008/0066440 filed Sep. 15, 2006 and published Mar. 23, 2008 and to Canadian application 2,559,353 discloses an arrangement which provides impellers of an hour glass shape arranged at the outer cutter disks.

U.S. Pat. No. 7,454,888 issued Nov. 25, 2008 which corresponds to U.S. Published Application 2008/0066441 filed Sep. 15, 2006 and published Mar. 23, 2008 and to Canadian application 2,559,217 discloses an arrangement which provides a transfer roller between the cutter disks and the conditioning rollers where the transfer roller is of the same diameter as the bottom roll and carries high ribs preferably forwardly inclined for an aggressive action on the crop. The roller is mounted with its axis above the cutting plane and its uppermost edge of the ribs at or above the axis of the bottom roll. The disclosure of this document may be referenced for further detail.

U.S. Pat. No. 8,015,784 issued Sep. 13, 2011 and originally published Mar. 23, 2009 which corresponds to Canadian application 2,639,032 discloses an arrangement where a swath converging apparatus is mounted in the mouth of the opening and is formed by two pairs of upstanding cylindrical rollers rotatable about their axes in a direction to carry the crop inwardly of the discharge opening. The pairs are mounted on respective top and bottom plates which pivot about the axis of the outer roller with the latter extending forwardly to overlap a floor plate of the cutter bar. The disclosure of this document may be referenced for further detail.

U.S. Pat. No. 8,006,469 issued Aug. 30, 2011 and originally published Mar. 19, 2009 discloses an arrangement where a swath converging apparatus is mounted behind impellers on the end cutter disks to carry the crop to the discharge opening.

U.S. Pat. No. 7,308,947 issued Dec. 18, 2007 discloses a construction of a pull type apparatus using rotary cutters.

The disclosure of each of the above document is hereby incorporated by reference or may be referred to for further details not disclosed herein.

In many cases the discharge opening contains a conditioner for engaging and breaking or fracturing the crop to improve drying action as the swath is left in the field. Such conditioners can be of a number of different types but one common type uses a pair of fluted rollers which form a nip so that the crop is bent as it passes between the flutes.

In some cases rotary cutters of this type are transported on a pull type frame carried on ground wheels and towed by a utility tractor. In other cases the frame of the rotary cutter is supported at the forward end of a dedicated swather tractor as a self-propelled system and the present invention can be directed to either type of system.

In many cases the cutter bar carrying the rotary cutters is held by the support system of the transporting vehicle, whether that be a pull type of self-propelled, so that it remains generally horizontal during the cutting action. The so-called self-propelled system provides on the tractor some ability to tilt the header forwardly and rearwardly so that the angle of the cutter bar to the ground changes.

In German DE 40 07 735 of Claas published Sep. 12, 1991 there is disclosed a four bar support linkage for the cutter bar which allows a floating action. The linkage is arranged such that the cutter bar initially tilts so that its front edge is raised as the whole cutter bar is raised on the linkage during the floating action. As the cutter bar moves yet higher in the floating action the cutter bar moves back to the original flat or un-tilted condition. The linkage then reverse in action as the cutter bar falls from the elevated position back to the original position. Thus during the downward movement the cutter bar again tilts so that its front edge is raised.

SUMMARY OF THE INVENTION

It is one object of the invention to provide a crop harvesting header of the type having a series of rotary cutting disks on a cutter bar in which the cutter bar is tilted during floating movement to better follow the ground contour.

According to the invention there is provided a crop harvesting machine for cutting a standing crop comprising:

a cutter bar mounted across a width of the machine for movement across the ground for harvesting the standing crop, the cutter bar defining a cutter plane;

a vehicle for carrying the cutter bar comprising:

a support frame;

ground wheels for supporting the support frame in movement across the ground;

a mounting assembly supporting the cutter bar on the support frame arranged so as to allow up and down floating movement of the cutter bar relative to the support frame;

a tilting system for tilting the cutter bar about an axis transverse to the machine so as to tilt the cutting plane from a generally horizontal position forwardly so that a front edge of the cutting plane moves downwardly and a rear edge of the cutting plane moves upwardly and from the generally horizontal position rearwardly so that the front edge of the cutting plane moves upwardly and the rear edge of the cutting plane moves downwardly;

and a control arrangement for operating the tilting system in response said upward and downward floating movement of the cutter bar so that the cutter bar when moving upwardly tilts rearwardly and when moving downwardly tilts forwardly.

In one example, the cutter bar includes a plurality of cutter disks mounted on the cutter bar at positions spaced transversely of the header with the disks being mounted on the cutter bar for driven rotation about respective generally upright axes spaced along the cutter bar where each disk has mounted thereon at a position spaced outwardly from the respective axis thereof at least one cutter blade such that rotation of the disk about its axis causes a standing crop to be cut by the blade as it rotates around the axis on the disk where the cutter bar is arranged such that the disks define the common cutting plane containing a path of the blades of the cutting disks. However other types of header can use the same tilt system including sickle bar headers.

Preferably there is provided a detector system responsive to said upward and downward floating movement of the cutter bar relative to the support frame and the control arrangement operates the tilting system in response to the detector system so that the cutter bar when moving upwardly tilts rearwardly and when moving downwardly tilts forwardly. Alternatively the tilting can be effected by a control arrangement which is mechanically connected to the float rather than using a detector system.

In one preferred arrangement, the detector system is arranged to provide a signal indicative of float height of the cutter bar and the control system is arranged to analyze changes in the signal to determine times when the cutter bar is moving upwardly, times when the cutter bar is moving downwardly and times when the cutter bar is remaining at a constant height.

The arrangement herein can be applied to a self-propelled system using a dedicated swather tractor or to a pull type header. The same system can be used on other vehicle types such as a combine harvester. That is the present invention also has application for draper headers on windrowers and/or on a combine harvester.

Preferably the cutter bar is carried on a cutter bar frame carried on the support frame and wherein the tilting system is arranged to cause said tilting of the cutter bar by tilting the support frame relative to the vehicle about an axis transverse to the vehicle.

Preferably the mounting assembly providing said floating movement is provided between the cutter bar frame and the support frame.

Preferably the cutter bar frame is carried on the support frame by links which cause upward floating movement of the cutter bar frame in response to rearward movement of the cutter bar frame relative to the support frame.

Preferably the links comprise parallel links suspended downwardly from the support frame to the cutter bar frame.

Preferably there is provided at least one spring acting on the links to apply a force to the links forwardly so that the spring is resiliently deformed to provide said spring float as the links pivot rearwardly.

BRIEF DESCRIPTION OF THE DRAWINGS

In the drawings like characters of reference indicate corresponding parts in the different figures.

DETAILED DESCRIPTION

Figure 1:
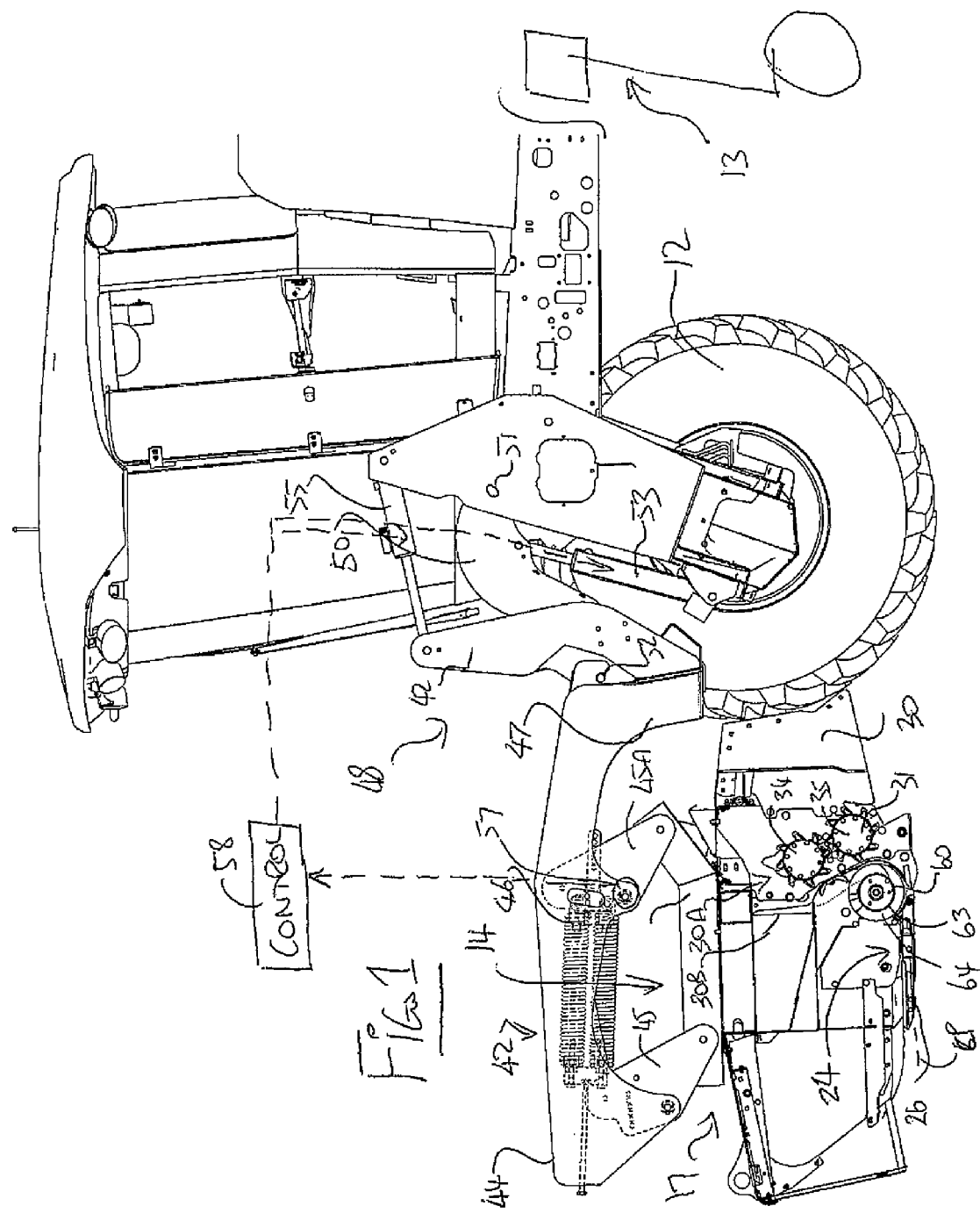
FIG. 1 is an isometric view of a self-propelled swather according to the present invention.
Figure 2:
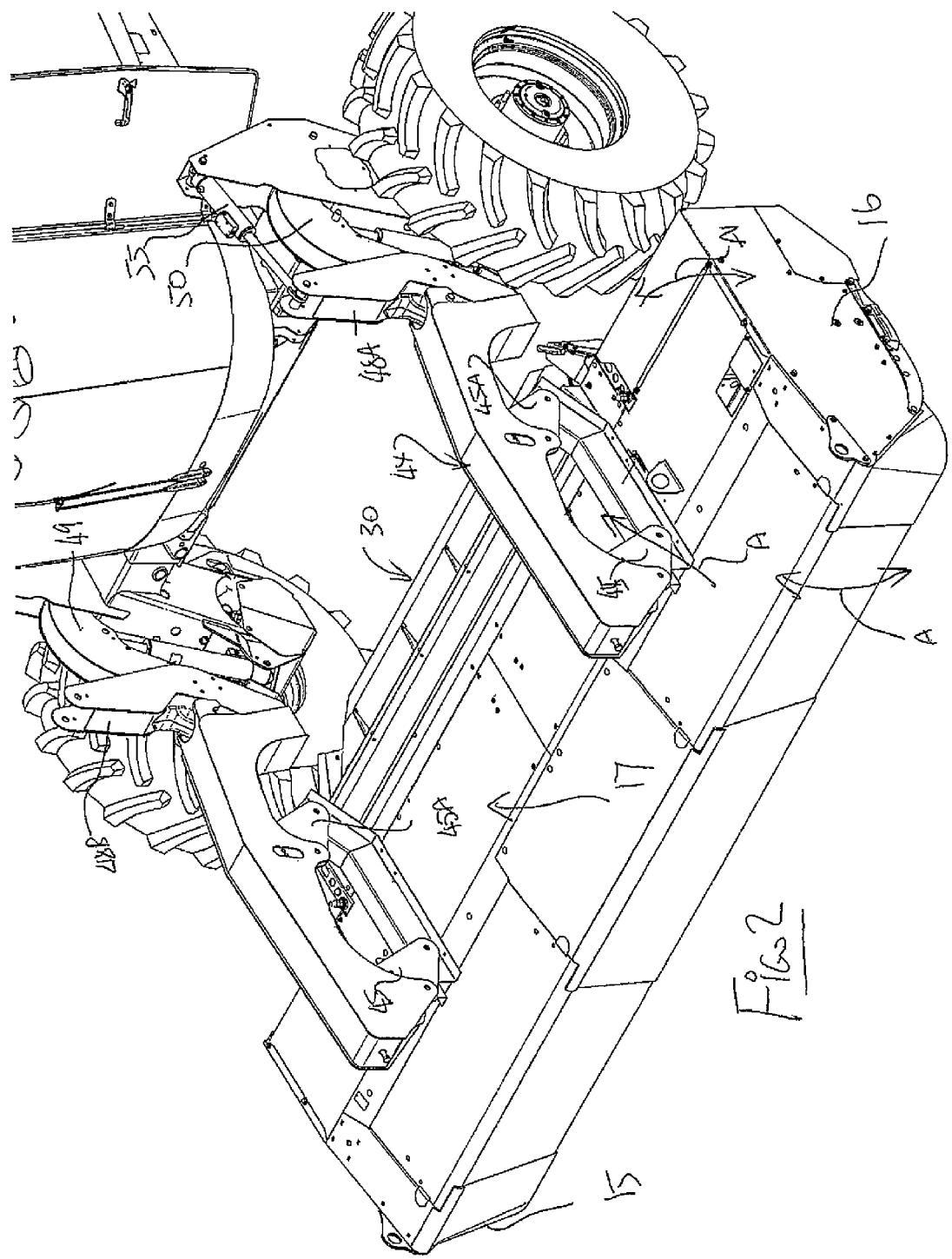
FIG. 2 is a cross-sectional view along the lines 2-2 of FIG. 1.

In FIG. 1 is shown schematically a header 14 for attachment to conventional swather tractor 10 of the well-known type having driven ground wheels 12 and rear castor wheels 13.

An alternative arrangement can be of the pull-type for towing behind a tractor and the construction of the hitch and support wheels of such a device is well known to a person skilled in this art.

A front support assembly 48 of the tractor carries the header 14 including left and right lift arms 49, 50 which carry the header across the ground along skid plates (not shown) of the header. The header includes side walls 15 and 16 forming part of a frame 17 attached to the transport system of the tractor. The frame carries a cutter bar 24 which is provided a gear train (not shown) of meshing gears carried on suitable bearings so as to provide communication of drive of a number of vertical shafts carried on the cutter bar each for rotating a generally horizontal disk 26 about a vertical axis of the shaft. The disks are substantially identical. The disks are generally elliptical in shape and carries at each of the ends a respective one of a pair of flails each for pivotal movement about a flail mounting pin. The flails project outwardly beyond the edges of the disk for rotation in a common horizontal cutting plane generally parallel to the plane of the cutter bar in a cutting action.

The disks are intermeshed so as to driven synchronously and they are arranged at 90° phase difference so that adjacent pairs of the disks are at 90° offset as they rotate to avoid interference between the disks and the blades carried thereby.

The cutter bar of this general construction is of a conventional nature and many examples of a commercial arrangement of this type are available in the market place. Thus the details of the cutter bar and its mounting are well known to one skilled in the art and further details can be obtained from such commercial devices.

The cutter bar 24 is wider than a discharge opening 30 with an entrance mouth 30A defined in a back sheet 30B forming a vertical rear panel of the header behind the cutter bar. A conditioning system 31 is mounted in the discharge opening 30. Thus the crop material passes over and between the disks when cut and also must be converged from the full cut width into the entrance mouth of the discharge opening 30.

The discharge opening has side walls which are vertical and parallel and extend rearwardly from the mouth and which confine the crop material to pass through the discharge opening over a width less than the width of the header so that the side walls are spaced inwardly from the respective end walls 15 and 16 of the header. The crop conditioning system 31 is arranged to span the width of the crop discharge opening so that the width of the conditioning system is equal to the width of the discharge opening. The conditioning system comprises a top roller 34 and a bottom roller 35 which have flutes arranged in a meshing arrangement so that the crop material passing through the discharge opening passes through a nip between the conditioning rolls and is discharged from the rear of the conditioning system as a swath of material to be discharged onto the ground or to be collected as required.

The disks 26 mounted on the cutter bar 24 include a series of disks which are located in front of the discharge opening 30. Outward of these disks and either side is provided a pair of outer disks each of which carries an impeller mounted on the disk so as to be carried thereby and driven thereby and so as to be directly co-axial with the disk. It will be appreciated that the disk and the impeller co-operate to assist in carrying the crop material inwardly toward the discharge opening and to resist the crop material from moving rearwardly over the disks.

In a ten or twelve disk mower, in front of the discharge opening there are located eight of the cutter disks arranged in four pairs of disks with each pair arranged to rotate in opposite directions such that the crop tends to pass between the pair of disks. Narrower machines of the type typically used in Europe or other countries where smaller machines are more suitable may have only three pairs of disks in front of the discharge opening.

An auger element 60 comprises an auger tube 63 and an auger flight 64 carried on the tube such that rotation of the auger tube acts to lift the crop upwardly and over the auger element as an overshot auger while at the same time the helical angle of the flight 64 acts to carry the crop on top of the auger tube inwardly toward the discharge opening 30.

The arrangement and construction of the header is described in detail in the above referenced patents, to which reference may be made for further details.

Thus the crop harvesting machine for cutting a standing crop includes the cutter bar 24 mounted across a width of the header for movement across the ground for harvesting the standing crop with a plurality of cutter disks 26 mounted on the cutter bar 24 at positions spaced transversely of the header with the disks being mounted on the cutter bar for driven rotation about respective generally upright axes spaced along the cutter bar. Each disk has mounted thereon at a position spaced outwardly from the respective axis thereof at least one cutter blade such that rotation of the disk about its axis causes a standing crop to be cut by the blade as it rotates around the axis on the disk;

The cutter bar is arranged such that the disks define a common cutting plane CP containing a path of the blades of the cutting disks.

The vehicle 10 for carrying the cutter bar in the embodiment shown comprises a swather tractor and includes a support frame 40 carried on ground wheels 12, 13 for supporting the support frame in movement across the ground.

The mounting assembly for supporting the cutter bar frame on a support frame 42 is arranged so as to allow up and down floating movement of the cutter bar frame and the cutter bar 24 relative to the support frame 42.

The support frame includes an upper portion 44 extending over the cutter bar frame and connected to it by pivotal links 45, 45A forming a four bar linkage and biased toward a lowest position by springs 46. The cutter bar frame is carried on the support frame by the links 45, 45A which incline downwardly and rearwardly so that they cause upward floating movement of the cutter bar frame 30 in response to rearward movement of the cutter bar frame 17 relative to the support frame 42 as indicated at the arrows A. The links 45, 45A comprise parallel links suspended downwardly from the support frame to the cutter bar frame. The spring 46 acts on the links to apply a force to the links forwardly so that the spring is resiliently deformed to provide said spring float as the links pivot rearwardly.

The support frame also includes a rear depending portion 47 which is connected to the tractor by a lift and tilt system generally indicated at 48. This includes a pair of lower links 49 and 50 connected to the tractor at rear pivot connections 51 and connected to the portion 47 at front pivot connections 52. Each of the arms can be raised and lowered by a hydraulic actuator 53. The system 48 further includes connecting links 55 each extending from the tractor at the rear to a respective up-standing support member 48A, 48B. Each link 55 includes a hydraulic actuator 56 which acts as a tilting system for tilting the cutter bar about an axis X at the pivot connection 52 transverse to the machine so as to tilt the cutting plane CP from a generally horizontal position as shown. Thus the cutting plane CP can pivot forwardly so that a front edge of the cutting plane moves downwardly and a rear edge of the cutting plane moves upwardly. The cutting plane can also pivot from the generally horizontal position shown rearwardly so that the front edge of the cutting plane moves upwardly and the rear edge of the cutting plane moves downwardly, as shown at the arrows A and A1.

A detector system 57 is responsive to said upward and downward floating movement of the cutter bar frame 30 relative to the support frame 42. This detector comprises an angle detection element mounted at the pivot of one of the links 44, 45 so that it emits a signal proportional to the angle of the link about its pivot axis which is proportional to the height of the frame 30 in its float range. Thus the detector system 57 is arranged to provides signal indicative of float height of the cutter bar and a control system 58 is arranged to analyze changes in the signal to determine times when the cutter bar is moving upwardly, times when the cutter bar is moving downwardly and times when the cutter bar is remaining at a constant height. The control system 58 is arranged for operating the tilting system at the actuator 55 in response to the detector system so that the cutter bar when moving upwardly tilts rearwardly and when moving downwardly tilts forwardly. That is the control system 58 detects when the signal is changing to be indicative of the cutter bar being driven upwardly in its float by contact with rising ground surface and uses this detection to operate the cylinders 55 to retract causing the frame 42 and the cutter bar carried thereby to tilt in the rearward direction to cut against the upwardly rising ground surface. That is the control system 58 detects when the signal is changing to be indicative of the cutter bar falling downwardly in its float by the falling ground surface moving away from the cutter bar, and uses this detection to operate the cylinders 55 to extend causing the frame 42 and the cutter bar carried thereby to tilt in the forward direction to cut against the downwardly falling ground surface.

The invention claimed is:

1. A crop harvesting machine for cutting a standing crop comprising:
    a cutter bar mounted across a width of the machine for movement across the ground for harvesting the standing crop, the cutter bar defining a cutting plane;
    a vehicle carrying the cutter bar comprising a support assembly and ground wheels supporting the support assembly in movement in a forward direction across the ground;
    a mounting assembly supporting the cutter bar on the support assembly which has components which provide up and down floating movement of the cutter bar relative to the support assembly;
    a detection arrangement responsive to said up and down floating movement of the cutter bar relative to the support assembly;
    a tilting system which has components to tilt the cutter bar about an axis transverse to the forward direction of the machine so as to tilt the cutting plane from a generally horizontal position forwardly so that a front edge of the cutting plane moves downwardly and a rear edge of the cutting plane moves upwardly and from the generally horizontal position rearwardly so that the front edge of the cutting plane moves upwardly and the rear edge of the cutting plane moves downwardly;
    and a control arrangement connected to detection arrangement;

said control arrangement including components operating the tilting system in response to said detection arrangement responsive to said upward and downward floating movement of the cutter bar;

said control arrangement being operated when the cutter bar is moving upwardly to cause operation of the tilting system to tilt the cutting plane rearwardly;

said control arrangement being operated when the cutter bar is moving downwardly to cause operation of the tilting system to tilt the cutting plane forwardly.

2. The crop header according to claim 1 wherein the cutter bar includes a plurality of cutter disks mounted on the cutter bar at positions spaced transversely of the header with the disks being mounted on the cutter bar for driven rotation about respective generally upright axes spaced along the cutter bar where each disk has mounted thereon at a position spaced outwardly from the respective axis thereof at least one cutter blade such that rotation of the disk about its axis causes a standing crop to be cut by the blade as it rotates around the axis on the disk where the cutter bar is arranged such that the disks define the common cutting plane containing a path of the blades of the cutting disks.

3. The crop header according to claim 1 wherein the detection arrangement comprises a sensor which provides a signal indicative of float height of the cutter bar and the control system is arranged to analyze changes in the signal to determine times when the cutter bar is moving upwardly, times when the cutter bar is moving downwardly and times when the cutter bar is remaining at a constant height.

4. The crop header according to claim 1 wherein the vehicle is a tractor.

5. The crop header according to claim 1 wherein the vehicle is a pull type header.

6. The crop header according to claim 1 wherein the vehicle is a combine harvester.

* * * * *